(12) United States Patent
DeLoach, III

(10) Patent No.: US 10,935,971 B2
(45) Date of Patent: Mar. 2, 2021

(54) AUTOMATED DECOY WITH BATTERY HOLDER BALLAST

(71) Applicant: M. Frank DeLoach, III, St. Simons Island, GA (US)

(72) Inventor: M. Frank DeLoach, III, St. Simons Island, GA (US)

(*) Notice: Subject to any disclaimer, the term of this patent is extended or adjusted under 35 U.S.C. 154(b) by 0 days.

(21) Appl. No.: 15/911,457

(22) Filed: Mar. 5, 2018

(65) Prior Publication Data
US 2019/0250602 A1 Aug. 15, 2019

Related U.S. Application Data

(63) Continuation-in-part of application No. 15/897,710, filed on Feb. 15, 2018.

(51) Int. Cl.
| | |
|---|---|
| *A01M 31/06* | (2006.01) |
| *G05D 1/00* | (2006.01) |
| *G08B 21/18* | (2006.01) |
| *B63H 25/02* | (2006.01) |
| *H02J 7/00* | (2006.01) |
| *G08C 17/02* | (2006.01) |
| *G08C 19/28* | (2006.01) |

(52) U.S. Cl.
CPC .......... *G05D 1/0022* (2013.01); *A01M 31/06* (2013.01); *B63H 25/02* (2013.01); *G05D 1/0055* (2013.01); *G08B 21/182* (2013.01); *G08C 17/02* (2013.01); *G08C 19/28* (2013.01); *H02J 7/00* (2013.01); *H02J 7/0042* (2013.01); *B63H 2025/028* (2013.01)

(58) Field of Classification Search
CPC ..................................................... A01M 31/06
USPC ........................................................ 43/2, 3
See application file for complete search history.

(56) References Cited

U.S. PATENT DOCUMENTS

| | | | |
|---|---|---|---|
| 2,591,554 A * | 4/1952 | Kinney ................. | A01M 31/06 43/26.1 |
| 3,537,205 A | 11/1970 | Robert | |
| 3,793,761 A | 2/1974 | Bonham | |
| 3,916,553 A | 11/1975 | Lynch | |
| 4,322,908 A | 4/1982 | McCrory | |
| 4,535,560 A | 8/1985 | O'Neil | |
| 4,612,722 A | 9/1986 | Ferrel | |
| 4,757,630 A | 7/1988 | Torberg | |
| 4,965,953 A | 10/1990 | McKinney | |
| 5,377,439 A | 1/1995 | Roos et al. | |
| 5,775,022 A | 7/1998 | Sumrall et al. | |
| 6,079,140 A | 6/2000 | Brock, IV | |
| 6,601,333 B2 * | 8/2003 | Cicoff ................. | A01M 31/06 43/2 |

(Continued)

*Primary Examiner* — Darren W Ark
(74) *Attorney, Agent, or Firm* — Smith Tempel Blaha LLC; Gregory Scott Smith

(57) ABSTRACT

A decoy system with a ballast that holds batteries to power the various elements of the decoy system including a Global Positioning System or location based receiver and circuitry that automatically controls the navigation of the decoy based on real-time location and desired/selected pattern information. The system can include a decoy with a propulsion system and steering system and an interface to a smart phone running a remote control app. The remote control app can be used to control the navigation of the decoy in view of the location information received from the GPS.

6 Claims, 9 Drawing Sheets

(56) References Cited

U.S. PATENT DOCUMENTS

| | | | | |
|---|---|---|---|---|
| 7,634,867 B2* | 12/2009 | Bill | A01M 31/06 43/2 |
| 7,788,838 B2* | 9/2010 | Anthony | A01M 31/06 43/2 |
| 8,276,308 B1* | 10/2012 | Jones | A01M 31/06 43/2 |
| 9,414,583 B2* | 8/2016 | Burton | A01M 99/00 |
| 9,924,711 B1* | 3/2018 | Gill, II | A01M 31/06 |
| 10,194,654 B2* | 2/2019 | Hanson | A01M 31/06 |
| 10,231,448 B2* | 3/2019 | Hanson | A01M 31/06 |
| 10,292,380 B1* | 5/2019 | DeLoach, III | A01M 31/06 |
| 2006/0010763 A1* | 1/2006 | Podlewski | A01K 85/01 43/17.6 |
| 2008/0159079 A1* | 7/2008 | Dir | A01K 97/125 367/139 |
| 2009/0151217 A1* | 6/2009 | Gregory | A01M 31/06 43/3 |
| 2009/0188148 A1* | 7/2009 | Orris | A01M 31/06 43/3 |
| 2009/0272020 A1* | 11/2009 | Bill | A01M 31/06 43/3 |
| 2010/0011650 A1* | 1/2010 | Leonards, Sr. | A01M 31/06 43/3 |
| 2012/0090217 A1* | 4/2012 | Young | A01M 31/06 43/3 |
| 2015/0096500 A1* | 4/2015 | McCain | A01M 31/004 119/719 |
| 2016/0309704 A1* | 10/2016 | Young | A01M 31/06 |
| 2017/0049095 A1* | 2/2017 | Hanson | A01M 31/06 |
| 2017/0231209 A1* | 8/2017 | Pippins | A01K 97/00 43/17 |
| 2017/0280706 A1* | 10/2017 | Kubinec | A01M 31/06 |
| 2017/0332620 A1* | 11/2017 | Noe | A01M 31/06 |
| 2017/0339942 A1* | 11/2017 | Van Grinsven | A01M 31/06 |
| 2018/0192638 A1* | 7/2018 | Denmon | A01M 31/06 |

* cited by examiner

AUTOMATED DECOY WITH BATTERY HOLDER BALLAST

BACKGROUND

Since the onset of hunting, hunters have sought ways to sneak up on or ambush their prey. Whether hiding behind a tree, curled up in a blind or dressing to blend in with the environment, hunters continue to seek ways to lure in a prey. In the field of fowl hunting, the use of decoys and calls have become common place in typical hunting excursions.

Waterfowl hunting is the practice of hunting ducks, geese or other waterfowl for sport, food, feathers, etc. Waterfowl can be hunted in crop fields where they feed, or, more frequently, on or near bodies of water such as rivers, lakes, ponds, swamps, sloughs, or oceanic coastlines. One proliferate hunting technique that has been used throughout the years is the employment of decoys.

The use of stagnant decoys to attract animals is well known in the various fields of hunting, but, in recent years the use of motion decoys have grown in popularity. Motion decoys are decoys that include some level of motion activity that is designed to more effectively attract prey. This is true for many different species of animals, including fowl. A common motion decoy design for fowl that has been used by hunters is to attach a line to a decoy and then to use the line to move the decoy. The moving decoy may be more noticeable than a motionless decoy to birds flying by at a distance.

Other motion decoys use a line and an anchor. The line is attached between the decoy and the anchor and the anchor is dropped into the water. The decoy then moves around within the range of the line, in response to the wind and water currents.

Another relatively simple motion decoy is the flag decoy. These decoys are simple fowl-shaped flags that are affixed to the top of a pole. The fowl-shaped flag is then waved, either by the user or by a breeze, to attract birds from a distance. However, as the birds approach the fowl-shaped flag, the flag and pole must be laid down since the motion does not provide the realism necessary to attract birds in close proximity to the outdoorsman. Other motion decoys have been developed that include spinning wings, moving heads, flapping wings, etc. Yet another motion decoy includes a duck that utilizes a bilge pump the thrust water and cause the decoy to appear to swim. The decoy is typically tethered to a battery and thus, the tether line provides power to control the bilge pump and it serves as a range limit on the motion and the battery operates as an anchor to help maintain a central location for the decoy.

Many other designs and attempts have been deployed in the decoy field but, there is still a need in the art for a decoy that is more realistic and more convenient for the hunter. The present disclosure presents embodiments directed towards these needs in the art as well as providing other advantageous features.

BRIEF SUMMARY

The present disclosure presents various embodiments, features and aspects of a decoy system that includes automatic navigational control based on real-time location information and selected pattern information, as well as, a ballast that is used to house a power source while providing the ballasting function for the decoy.

One exemplary embodiment includes a process for controlling the navigation of a decoy by accessing a positioning receiver that is configured to provide the real-time current location of the decoy. In some embodiments this process may include accessing Global Positioning System (GPS) data but other embodiments may use other location technologies. The process also includes executing a tracking algorithm that receives at least two inputs: data defining a navigational pattern for the decoy and data identifying the current location of the decoy. In addition, the process can operate to identify the current speed and direction of the decoy. The embodiment may then enter into a loop to continuously adjust the current speed and direction of the decoy to assure that the decoy is being navigated in accordance with the navigational pattern and periodically accessing the positioning receiver to update the real-time current location of the decoy. The process of adjusting the current speed and direction of the decoy comprises sending signals to a propulsion system associated with the decoy to control the speed of the decoy and sending signals to a steering system to control the direction of the decoy.

In various embodiments, the input that defines the navigational pattern can be obtained in a variety of manners and embodiments may include one or more of the following techniques: (a) presenting pattern options on a user interface and receiving a selection of a pattern; (b) receiving a range to identify a maximum distance from a base location; (c) presenting a user interface to allow a user to draw a pattern on a touch screen; (d) presenting a control interface to enable a user to directly control the navigation of the decoy, as non-limiting examples.

In the various embodiments, the decoy system may include a decoy body, along with a propulsion system and steering system that is associated with the decoy body. Further, the decoy system includes a positioning receiver that is also associated with the decoy body and configured to provide a current location of the decoy body. The positioning receiver may be based on GPS or some other location technology.

The decoy system includes a processor that is also associated with the decoy body and is connected or coupled to the propulsion system, the steering system and the positioning receiver. The processor operates to read instructions from a memory element and execute the instructions to control the navigation of the decoy body. Among other things, the processor sends commands and/or control signals to the propulsion system and steering system based at least in part on a current location received from the positioning receiver and a desired location. In some embodiments, the propulsion system may be controlled by an Electronic Speed Control or ESC. An ESC is an electronic circuit that is configured to control and regulate the speed of an electric motor, such as one that may be used to drive a propulsion system. The ESC may also provide reversing of the motor and dynamic braking. Miniature electronic speed controls are typically found in electrically powered radio controlled models. It should be appreciated that the propulsion system may be based on brushed motors, brushless motors and other motor types and the control system can be selected or adjusted accordingly.

In some embodiments, the decoy system also includes a control system. The processor is communicatively coupled to the control system. The control system wirelessly interfaces to a remote control or some other system to receive commands, instructions, data, or the like, to help in the navigational control of the decoy.

In some embodiments, as non-limiting examples, the control system may interface to a dedicated remote control or a mobile device (i.e. a smart phone, depth finder, marine radio, etc.) running a mobile app. In such embodiments, the tracking algorithm can be located within the decoy and executed by the processor, in the remote control, or a combination of both.

In some embodiments, the decoy system may include an accelerometer and/or a compass. In such embodiments, the processor can control the navigation of the decoy body based at least in part on information obtained from the accelerometer and/or compass.

These and other embodiments are more fully described in the detailed description accompanied with the drawings.

DETAILED DESCRIPTION OF THE VARIOUS EMBODIMENTS

The present invention, as well as features and aspects thereof, is directed towards providing a decoy with a ballast that is configured to hold a power source, such as batteries, and, wherein the decoy includes a system that utilizes current, real-time location information of the decoy, along with selected pattern information to control the navigation of the decoy.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

Figure 1:
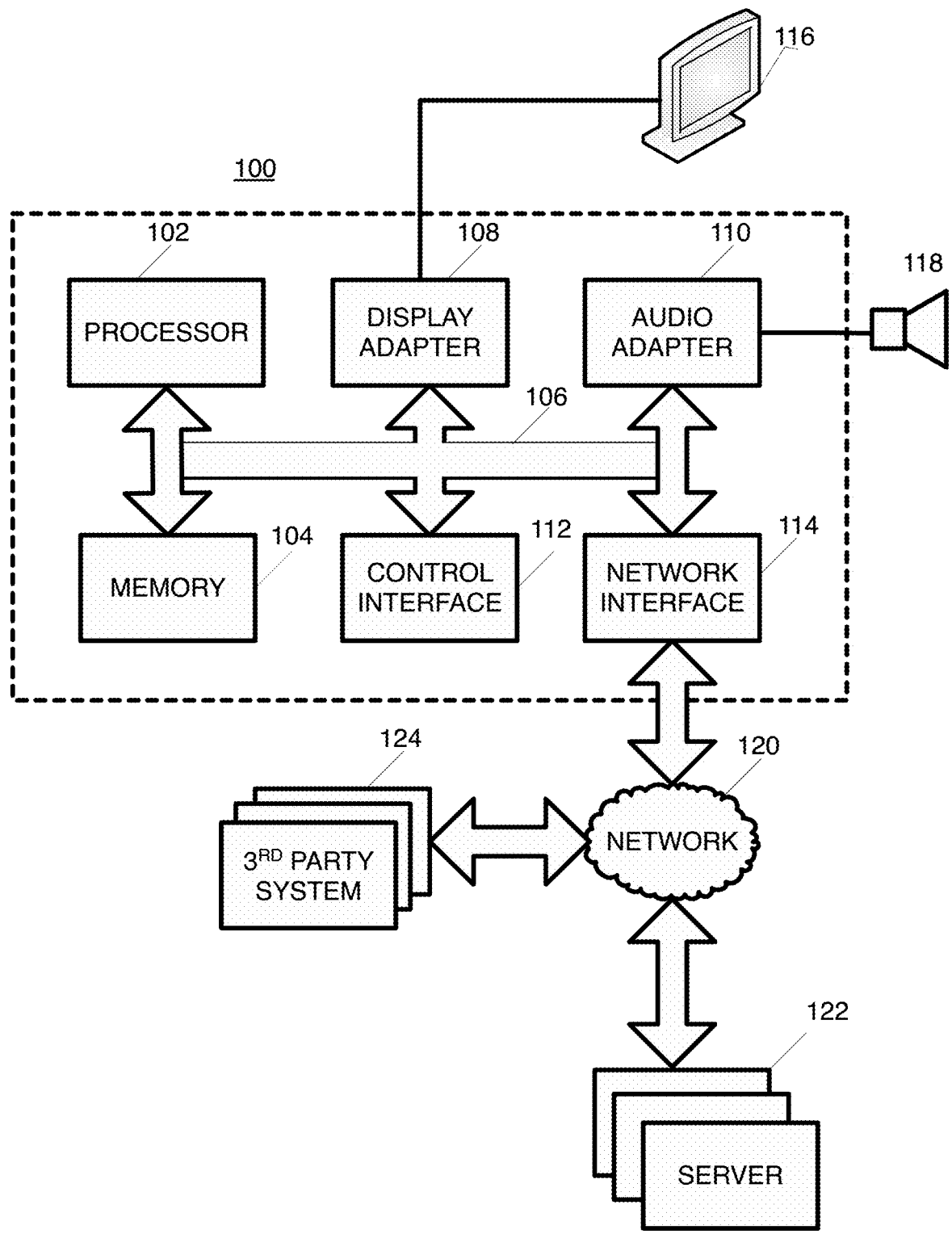
FIG. 1 is a block diagram of the functional components of an exemplary embodiment of a system, a sub-system or a device that may be included in various embodiments of the GEO-Decoy, such as a remote controller, a decoy controller, etc.

Turning now to the figures in which like labels refer to like elements in the various views, FIG. 1 is a block diagram of the functional components of an exemplary embodiment of a system, a sub-system or a device that may be included in various embodiments of the GEO-Decoy, such as a remote controller, a decoy controller, etc. It will be appreciated that not all of the components illustrated in FIG. 1 are required in all embodiments of the various devices but, each of the components are presented and described in conjunction with FIG. 1 to provide a complete and overall understanding of the functional components. A device, such as the control system within the GEO-Decoy or a remote control or an app running on a smart phone or other mobile device used to control the GEO-Decoy can include a general computing platform 100 illustrated as including a processor/memory device 102/104 that may be integrated with each other or, communicatively connected over a bus or similar interface 106. The processor 102 can be a variety of processor types including microprocessors, micro-controllers, programmable arrays, custom IC's etc. and may also include single or multiple processors with or without accelerators or the like. The memory element of 104 may include a variety of structures, including but not limited to RAM, ROM, magnetic media, optical media, bubble memory, FLASH memory, EPROM, EEPROM, etc. The processor 102, or other components in the controller may also provide components such as a real-time clock, analog to digital convertors, digital to analog convertors, etc. The processor 102 may also interface to a variety of elements including a control interface 112, a display adapter 108, an audio adapter 110, and network/device interface 114. The control interface 112 provides an interface to external controls, such as a propulsion system, steering system, accelerometer, electronic compass, sensors, actuators, pressure actuators, step motors, a keyboard, a mouse, a pin pad, an audio activated device, a wireless receiver, as well as a variety of the many other available input and output devices or, another computer or processing devices or the like. The display adapter 108 can be used to drive a variety of alert elements 116, such as display devices including an LED display, LCD display, one or more LEDs or other display devices. The audio adapter 110 interfaces to and drives another alert element 118, such as a speaker or speaker system, buzzer, bell, etc. The network/interface 114 may interface to a network 120 which may be any type of network including, but not limited to the Internet, Wi-Fi, BLUETOOTH, a global network, a wide area network, a local area network, a wired network, a wireless network or any other network type including hybrids. Through the network 120, or even directly, the controller 100 can interface to other devices or computing platforms such as one or more servers 122 and/or third party systems 124. A battery or power source provides power for the controller 100.

Figure 2:
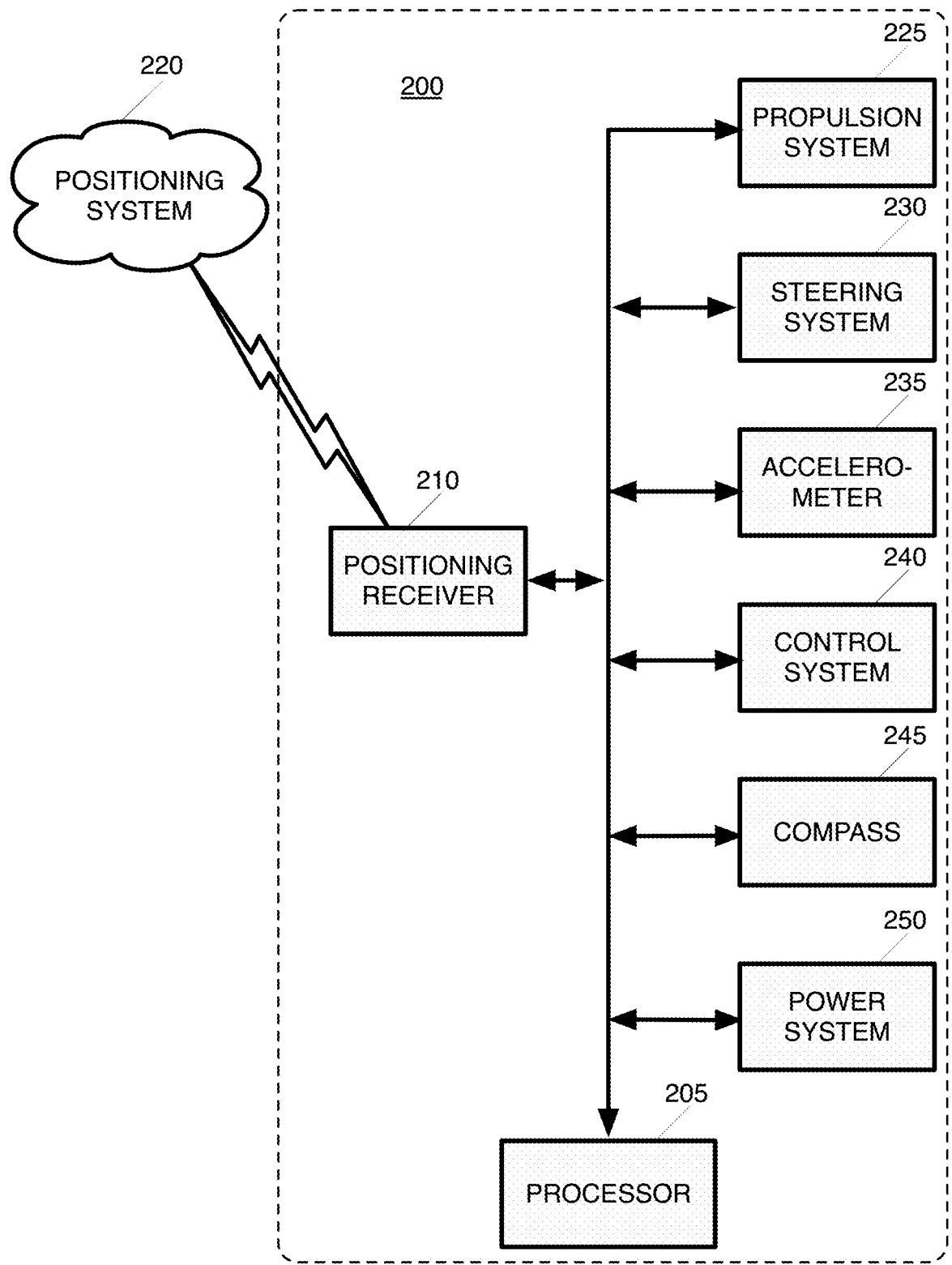
FIG. 2 is a block diagram showing specific control functions of an exemplary GEO-Decoy.

FIG. 2 is a block diagram showing specific control functions of an exemplary GEO-Decoy. The components of the GEO-Decoy 200 include a processor 205 that operates as the central controller for the GEO-Decoy. The processor 205 encompasses program and storage memory. The processor reads instructions from the program memory and executes those instructions to perform certain tasks. The program memory may thus include modules, routines, programs, etc. that are executed by the processor to perform such tasks. The processor 205 is illustrated as optionally interfacing to a Positioning Receiver 210, a Propulsion System 225, a Steering System 230, an Accelerometer 235, a Control System 240, a Compass 245 and a Power System 250.

The processor 205 may be any of a variety of processor chips, ASICS, micro-controllers, etc. The processor 205 may interface to the various components over a bus system 260 as illustrated, may interface to the various components directly through control lines or dedicated lines, or a combination of both. The processor 205 interfaces to a memory component to obtain instructions for operating the GEO-Decoy. For instance, the programming for the GEO-Decoy may include one or more different controlling or navigational programs that are used to determine the various movement parameters of the GEO-Decoy. As a non-limiting example, one program may cause the GEO-Decoy to move in a circular type pattern within a certain radius from a specific location, such as latitudinal and longitudinal coordinates. As such, the processor can follow an algorithm to control the movement of the GEO-Decoy.

The Processor 205 may interface with a GPS Receiver 210 to determine the current location of the GEO-Decoy. The Positioning Receiver 210 receives signals from a Positioning System 220 and utilizes those signals to identify a spatial, absolute position. It should be appreciated that while the illustrated and described embodiments emphasize the use of the Global Positioning System (GPS), the present invention is not limited to the use of such system. Some embodiments may use other positioning systems such as monitoring mobile cellular telephone tower strengths, using a beacon, using a plurality of beacons and performing triangulation, using a grid system that is wireless or optically tracked, etc. Thus, in some embodiments, the positioning receiver may simply receive a signal indicative of its current location, whereas in other embodiments, the positioning receiver 210 may detect one or more signals and conduct signal analysis and mathematical analysis to identify its current location. Regardless of the technology employed, the Processor 205 can access the Positioning Receiver 210 to determine the current location of the GEO-Decoy and use that information as input to an active controlling algorithm.

Based on the current location of the GEO-Decoy as determined by accessing the Positioning Receiver 210, the Processor 205, responsive to instructions in the selected navigational program, can control the Propulsion System 225 and the Steering System 230 to control the movement of the GEO-Decoy. In absolute positioning system, such as the GPS, the Processor 205 can send instructions to the Propulsion System 225 and Steering System 230 to direct the GEO-Decoy to a next desired or programmed location. The Processor 205 may also interface to an Accelerometer 235 to gather further information regarding the location, direction, speed and orientation of the GEO-Decoy. Similarly, the GEO-Decoy may include a Compass 245, such as an electronic compass or a compass that can be read from a processor. The information from the Accelerometer 235 and/or Compass 245 can also serve as input to the selected navigational program in determining adjustments to make to the Propulsion System 225 and/or the Steering System 230. For instance, if the GEO-Decoy has reached the next program position, prior to sending instruction signals to the Steering System 230, the orientation of the GEO-Decoy can be determined by accessing the Accelerometer 235 and/or Compass 245 to identify the current orientation of the GEO-Decoy.

In some embodiments, the Propulsion System 225 may be controlled by an Electronic Speed Control or ESC. An ESC is an electronic circuit that is configured to control and regulate the speed of an electric motor, such as one that may be used to drive a propulsion system. The ESC may also provide reversing of the motor and dynamic braking. Miniature electronic speed controls are typically found in electrically powered radio controlled models. It should be appreciated that the propulsion system may be based on brushed motors, brushless motors and other motor types and the control system can be selected or adjusted accordingly. Further, the Steering System 230 may be controlled by a servo-motor or other similar mechanism. As a non-limiting example, in response to commands from a remote control or the processor, the servo-motor can be used to move the Steering System 230 to direct the GEO-Decoy. As those skilled in the art will appreciate, the servo-motor may include a trim feature that can be used to adjust a steady state or neutral state for the servo-motor so that at rest, the Steering System 230 is set to a default position. In some embodiments this default would be straight but in other embodiments, it may be desired to have the default cause the GEO-Decoy to move in a circular motion. Advantageously, with a circular motion default, if the GEO-Decoy malfunctions, it may simply revert to moving in a circle rather than taking off in a single direction.

The Control System 240 can be used for input to the Processor 205 to control the operation of the GEO-Decoy and/or, may be used by the Processor 205 to control other systems and/or devices. As a non-limiting example, the Control System 240 may include a BLUETOOTH transceiver for receiving and transmitting BLUETOOTH signals. It should be appreciated that a ZigBee module or an 802.11 transceiver or other similar technologies may also be utilized. The BLUETOOTH interface can then be used for a variety of purposes, such as to control the operation of the GEO-Decoy, to provide status as to the location of the GEO-Decoy, to provide status regarding the operation of the GEO-Decoy (i.e., low battery, loss of detection of Positioning System 220 signal, Steering System 230 malfunction, Propulsion System 225 malfunction, etc.). As will be described in greater detail, a BLUETOOTH or other wireless interface may be utilized by a remote control or an app to control and monitor the operation of the GEO-Decoy.

The GEO-Decoy can be powered by a stored power system, such as batteries, rechargeable batteries, solar rechargeable batteries, solar assist rechargeable batteries, etc. as a few non-limiting examples. In general, any portable and wireless power source may be utilized for various embodiments of the GEO-Decoy. As a non-limiting example, an embodiment may employ the use of NiCad, Lithium Ion, or other battery technologies.

Figure 3:
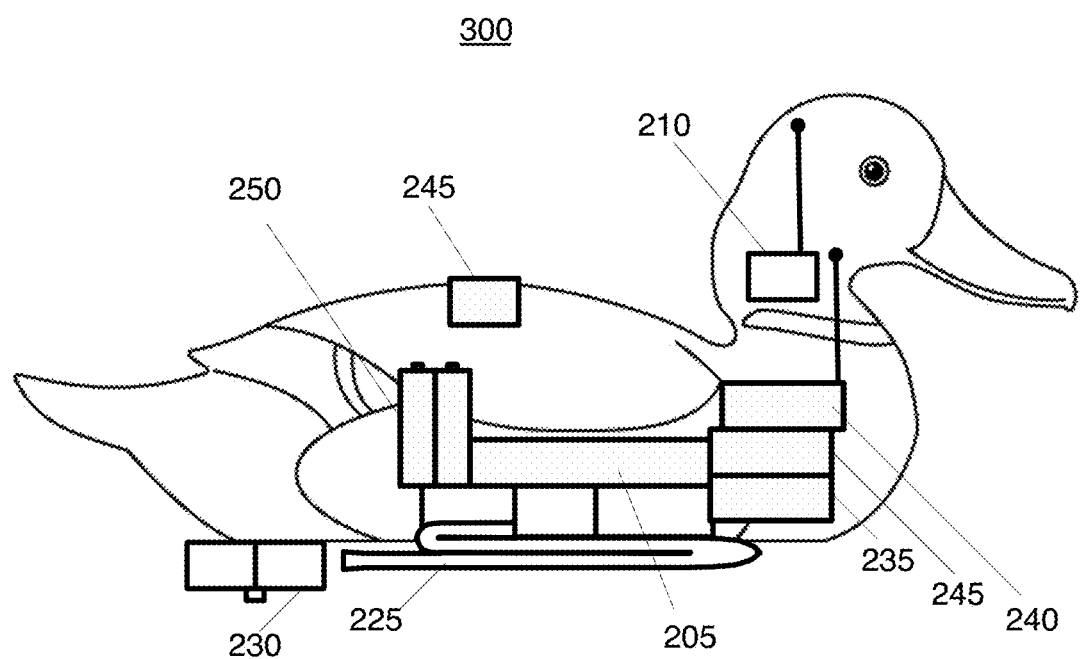
FIG. 3 is an exemplary drawing of a decoy device illustrating one embodiment that includes the functional elements presented in FIG. 2.

FIG. 3 is an exemplary drawing of a decoy device illustrating one embodiment that includes the functional elements presented in FIG. 2. It should be appreciated that not all of the elements presented in FIG. 2 and FIG. 3 are required in all embodiments of the GEO-Decoy and, the elements listed in FIG. 2 and FIG. 3 do not limit the inclusion of other additional elements into the various embodiments. Further, the functional break down presented in the drawings do not necessarily correspond with manufacturing and/or programming implementations but are rather presented in an effort to explain the operation of the various embodiments.

The GEO-Decoy can be fabricated out of a variety of materials, so long as the GEO-Decoy is buoyant and stable. For instance, some embodiments may be fabricated from hard plastic with a hollow interior. Other embodiments may be manufactured from STYROFOAM or other open cell or closed cell foam material. Yet other embodiments can be made from materials such as rubber, nylon, silicone, aluminum, wood, composite material, etc. as a few non-limiting examples. As such, some embodiments may be hollow, some solid and some solid with compartments for the various elements. For instance, some embodiments may house some or all of the control elements within the interior of the GEO-Decoy. Other embodiments may have one or more of the control elements external to the GEO-Decoy. The embodiment presented in FIG. 3 is a substantially hollow decoy housing most of the components within the interior of the decoy. As illustrated, the GEO-Decoy 200 houses the Processor 205, Positioning Receiver 210, the Accelerometer 235 (if included), the Compass 245 (if included), the Power System 250 and at least a portion of the Propulsion System 225. The Steering System 230 is shown as being external to the GEO-Decoy 200 but includes an interface to the Processor 205 for control purposes.

Figure 4:
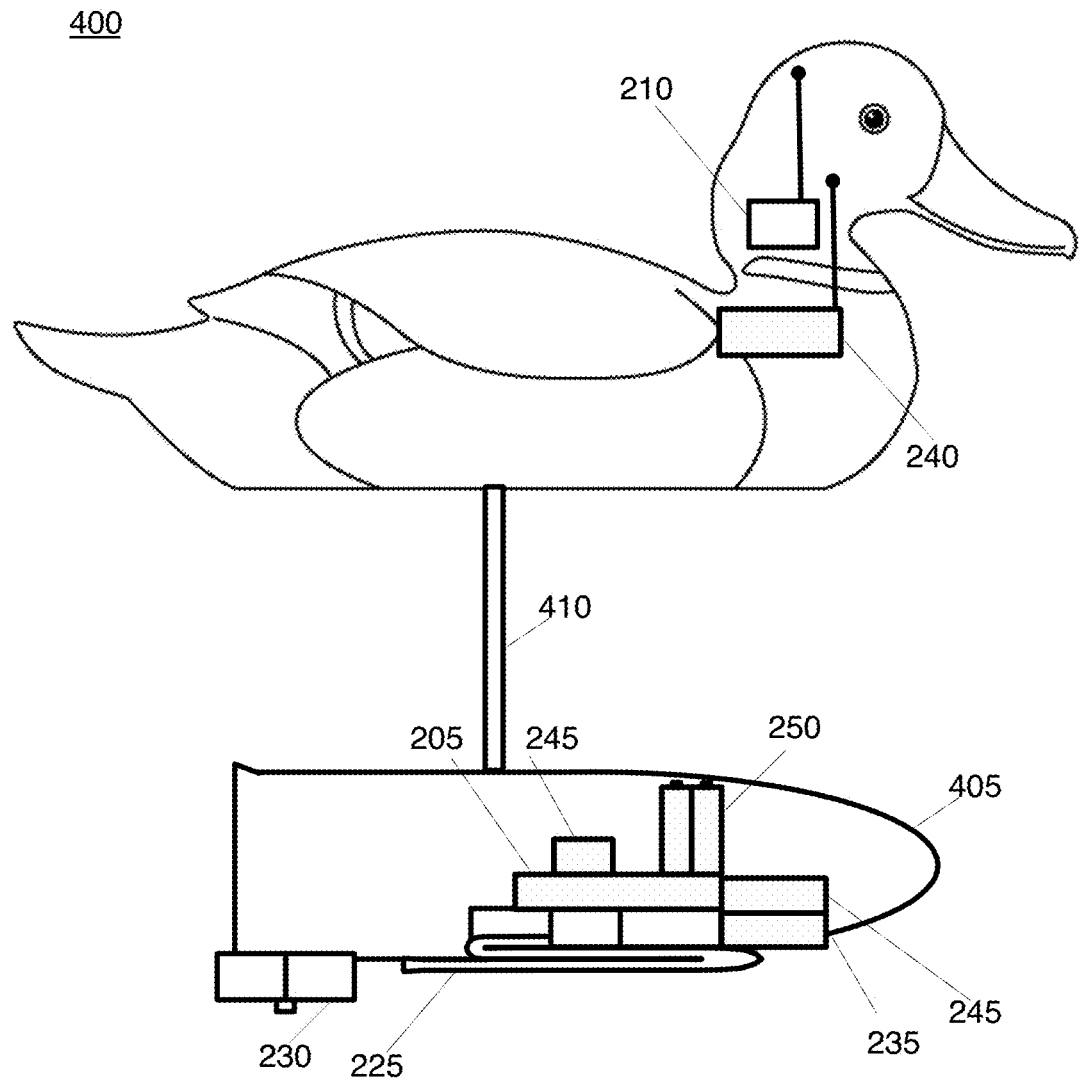
FIG. 4 is an exemplary drawing of a GEO-Decoy that houses a majority of the control components external to the GEO-Decoy.

FIG. 4 is an exemplary drawing of a GEO-Decoy that houses a majority of the control components external to the GEO-Decoy. In the illustrated embodiment, the GEO-Decoy 400 includes an external pod 405 for housing the various control components. The external pod can be used as a ballast to help stabilize the GEO-Decoy and can be shaped to efficiently cut through the water. The external pod 405 is illustrated as being attached to the underside or other area of the GEO-Decoy 400 by shaft 410. In the illustrated embodiment, the shaft 410 includes a communication interface between the Processor 205 and the Positioning Receiver 210 and the Control System 240. Thus, the Processor 205 can read the positioning coordinates from the Positioning Receiver 210 and send/receive commands and status information over the Control System 240. The remainder of the components are illustrated as being housed within the pod 405. This includes the Propulsion System 225, the Steering System 230, the Accelerometer 235 (if any), the Compass 245 (if any) and the Power System 250. It should be appreciated that in various embodiments, different arrangements of the components can be utilized. Thus, different combinations of components being housed within the decoy or the pod are anticipated. It should be appreciated that other embodiments are also anticipated, such as the pod being directly attached underneath the decoy, on top of the decoy, or other positions as well.

It should be appreciated that while the GEO-Decoy is illustrated as being a duck, other embodiments are also anticipated such as geese or any other water fowl or swimming animal. Thus, decoys that include various embodiments of the present invention may be used for hunting fowl, as well as alligators, sharks, etc. Furthermore, the GEO-Decoys, while predominately described herein as being deployed on the water, other embodiments can be deployable on dry ground or even launched in flight and the various features and aspects of the navigational control can still be utilized in such embodiments.

In the various embodiments, the decoy body and/or the pod need to be constructed in a waterproof or water resistant fashion to prevent the electronics in the control system from getting wet. Thus, the decoy body and/or the pod can be equipped with a water proof door or hatch that can be opened to gain access to the interior for installing the control electronics, changing batteries and maintaining the control electronics. The doors, hatches or opening may be equipped with rubber or silicon gaskets to help prevent water leakage. It should be appreciated that in some embodiments, the components within the decoy may be waterproof or water resistant in addition to or in lieu of the decoy being waterproof or water resistant.

The GEO-Decoy can be moved or propelled in the water using a variety of techniques. A few non-limiting examples of embodiment of the Propulsion System 225 include jet propulsion including water, air and/or steam jet propulsion, a miniature propeller, paddle wheel, fins or simulated feet, turbulent tube, a bilge pump, sails or fins on top of the GEO-Decoy to capture wind and be propelled by airflow, as well as a fan on top of the decoy. The propulsion system can be a fixed speed or may have the ability to adjust between specific speeds either as a step function or a continuous adjustment.

The GEO-Decoy is guided in specific directions using the Steering System 230. The Steering System 230 may be implemented in a variety of ways using a variety of technologies. In one exemplary embodiment, the Steering System 230 may include a rudder located under the GEO-Decoy and that can be moved between various positions in response to commands from the Processor 205. Thus, the Processor 205 can send commands to the Steering System 230 to cause the GEO-Decoy to turn left or right at various degrees, or to continue forward. In some embodiments, the rudder can be used to help brake or retard the speed of the GEO-Decoy.

In other embodiments, Propulsion System 225 and Steering System 230 can be combined into a single system. For instance, in a jet propulsion system, the jet output tube can be moved to various positions or orientations to direct the GEO-Decoy. In some embodiments, the jet output tube can be adjusted to propel the GEO-Decoy forward, turn the GEO-Decoy left at various degrees, turn the GEO-Decoy right at various degrees and even propel the GEO-Decoy backwards.

It should be understood that other mechanism may also be used for the Propulsion System 225 and the Steering System 230 and the described embodiments should not be construed as limiting examples. As another non-limiting example, the Propulsion System 225 and the Steering System 230 may include multiple propulsion elements in various orientations. In such an embodiment, the GEO-Decoy can be steered by changing the speed of or the power applied to the various propulsion elements. For example, a jet propulsion system may include four nozzles, one facing rearwards, one facing forwards, one facing to the right and one facing to left. By altering the velocity of the water, air or steam that is forced out of the propulsion tube the direction of the GEO-Decoy can be controlled. Similar techniques can be utilized for other propulsion systems, as well.

In addition to utilizing the Positioning Receiver 210 to identify the location of the GEO-Decoy, Accelerometers 235 can be utilized to determine or at least estimate the orientation of the GEO-Decoy. The orientation information can be useful in knowing what adjustments to make in attempting to steer the GEO-Decoy to a new location. To accomplish this, the GEO-Decoy control system should use three accelerometers with each one operating on different planes (i.e. in the X, Y and Z planes). Then the amplitude of the various accelerometers can be read to obtain a relative direction vector of the motion, provided the orientation of the sensors are known. This information combined with a gravity direction sensor and/or magnetic field sensor, such as using Compass 245, can thus be used to determine the direction information and the orientation of the GEO-Decoy.

Figure 5:
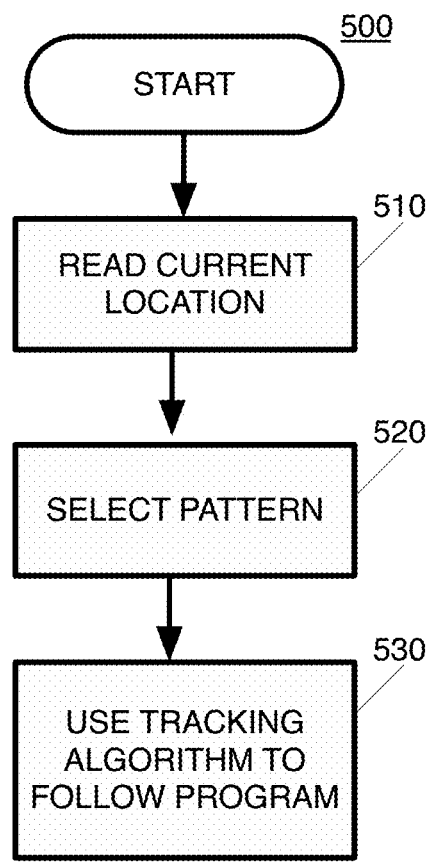
FIG. 5 is a flow diagram illustrating an exemplary high-level flow diagram for exemplary embodiments of the GEO-Decoy.

FIG. 5 is a flow diagram illustrating an exemplary high-level flow diagram for exemplary embodiments of the GEO-Decoy. The algorithm 500 commences and at block 510 proceeds to read the current location of the GEO-Decoy. As described above, this step may include the Processor 205 accessing the Positioning Receiver 210 to obtain the current coordinates of the GEO-Decoy, as well, as obtaining orientation and speed information from the Accelerometers 235, Compass 245 and Steering System 230.

Figure 8:
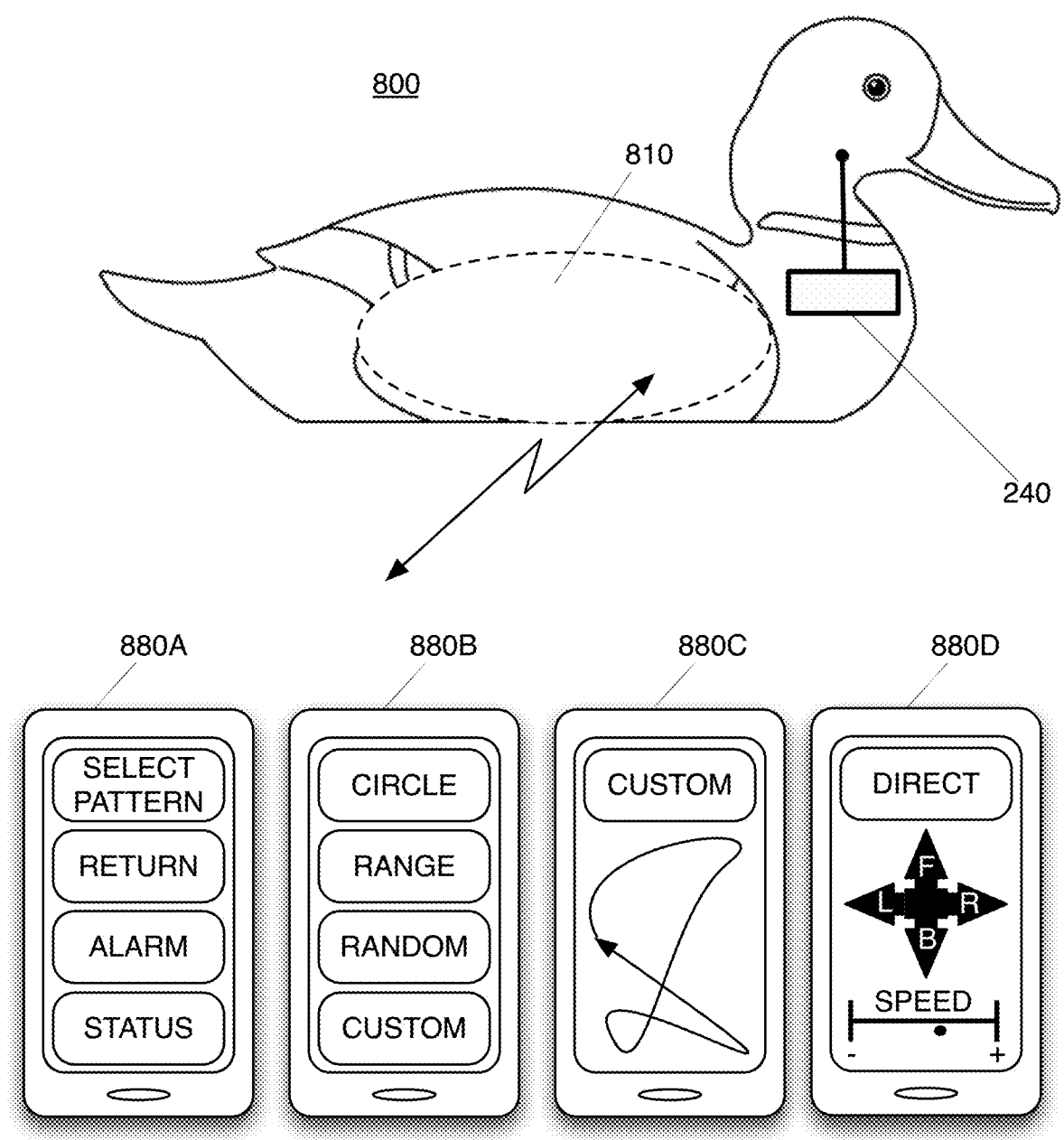
FIG. 8 is a conceptual diagram showing various features and aspects of a mobile device based remote control app interfacing to a decoy.

A program or pattern is then activated, or selected and then activated if multiple programs or patterns exist 520. A pattern is a set of rules, heuristics, data and/or commands that are used as input to control the direction and movement of the GEO-Decoy. A GEO-Decoy may include one pattern or may include multiple patterns that can be randomly, programmatically or operationally selected and enabled. For instance, in an exemplary embodiment, the GEO-Decoy may include the following patterns as non-limiting examples:

(a) FIG. 8 Pattern
(b) Oval/Circular Pattern
(c) Random Pattern
(d) Simple Back and Forth Pattern Thus, some patterns, in some embodiments may include a series of desired locations and a vectored path for traversing from one desired location to the next. Other patterns may simply include a range or maximum distance that the GEO-Decoy can move away from a base location. Other patterns may simply include a series of instructions for changing and/or adjusting the speed and direction of the decoy as a series of timed events. Further, each these patterns may include parameters such as a pattern size (i.e., 5, 10, 15 or 20 foot ranges) and the program may include various speed settings. It should be appreciated that the speed settings can be operationally selected, such as by the user of the GEO-Decoy, or randomly or programmatically selected.

Once a program is selected and activated, the Processor 205 operates as a tracking algorithm to follow the program 530.

Figure 6:
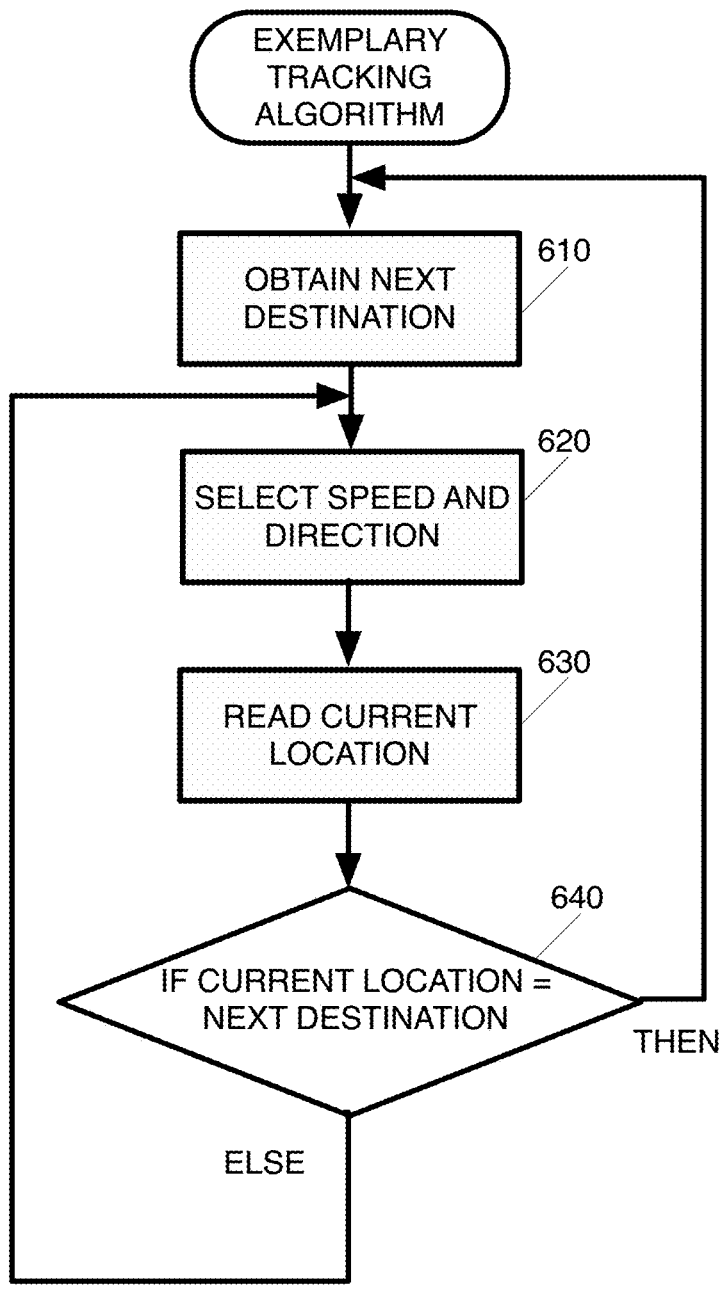
FIG. 6 is a flow diagram illustrating an exemplary tracking algorithm that can be employed on one or more embodiments of the GEO-Decoy.

FIG. 6 is a flow diagram illustrating an exemplary tracking algorithm that can be employed on one or more embodiments of the GEO-Decoy. In the illustrated flow diagram, the tracking algorithm first accesses the program to obtain the next destination to which the GEO-Decoy is to be moved 610. Next, in accordance with the program, the speed of the GEO-Decoy is selected and any direction adjustments of the GEO-Decoy are selected and/or calculated 620. As previously described, this process can include obtaining readings from accelerometers, compasses, gyroscopes, gravity sensors, etc. to further calculate adjustments that must be made to direct the GEO-Decoy to the next destination. Thus, it should be appreciated that such features allow the positioning receiver, such as a GPS receiver, to identify the current location of the GEO-Decoy, and the accelerometers, compass, gyroscope and/or gravity sensors provide information to determine the direction and orientation of the GEO-Decoy. Together, this information enables even more precise control over the GEO-Decoy. Once the Processor 205 has sent the appropriate commands to the Propulsion System 225 and Steering System 230 and set the desired speed, immediately or after a short delay, the current location of the GEO-Decoy is determined by reading location parameters from the Positioning Receiver 210 at step 630. The delay can be sub-second or may be several seconds or minutes depending on the embodiments, environmental conditions, etc.

At decision block 640, the current location of the GEO-Decoy is compared to the next destination. If the GEO-Decoy has reached the next destination, then a new next destination is selected by traversing back to block 610. Otherwise, the tracking algorithm continues by adjusting the speed and direction parameters of the GEO-Decoy 620, if necessary and continues in a loop of reading the current location 630 and then comparing that to the next destination.

Figure 7:
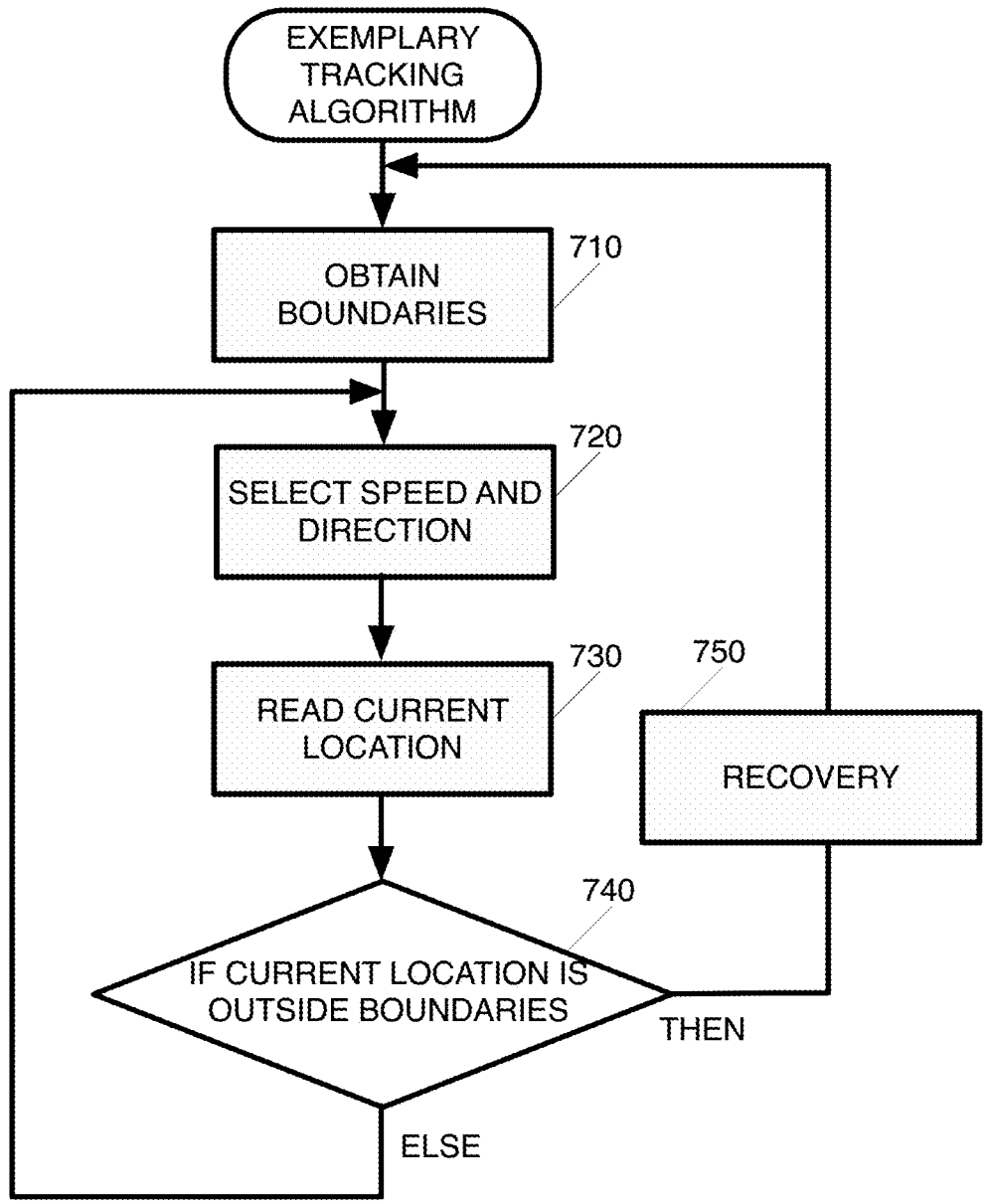
FIG. 7 is a flow diagram illustrating the operational flow of another exemplary tracking algorithm.

FIG. 7 is a flow diagram illustrating the operational flow of another exemplary tracking algorithm. In this embodiment, the tracking algorithm commences by obtaining positioning or location boundaries from the program 710. The boundaries define a geo-fence in which the GEO-Decoy is to be maintained. Based on the current location of the GEO-Decoy, the tracking algorithm then calculates a speed and direction that is suitable for the movement of the GEO-Decoy 720 but maintaining the integrity of the boundaries.

In the various embodiments, the direction of the GEO-Decoy can be controlled by following a pattern within the boundaries or simply by random selections of speeds and/or directions. Once the speed and direction of the GEO-Decoy has been set, the Processor 205 can access the Positioning Receiver 210 to obtain the current location of the GEO-Decoy. If the current location is not outside of the boundaries 740, then operation continues at block 720 to select a speed and direction in accordance with the algorithm. However, if the current location is outside of the boundaries 740, then recovery actions 750 can be taken to get the GEO-Decoy back within the boundaries. The recovery actions 750 may include directing the GEO-Decoy to an absolute location that is positioned within the middle of the boundaries as a non-limiting example.

It should be appreciated that a wide variety of algorithms and methodologies may be utilized in various tracking algorithms and programs and while the presented techniques may be considered to be novel, the various embodiments are not necessarily limited to the embodiments presented within this disclosure.

As previously described, the operation of the GEO-Decoy can be controlled either randomly, programmatically or by user control (as well as combinations of any of these techniques). For instance, a GEO-Decoy may be controlled randomly by having the Processor 205 randomly select a mode of operation when power is applied. Further, periodically the Processor 205 can randomly select a different mode of operation either in accordance with a schedule or also randomly.

In other embodiments, the GEO-Decoy can be programmatically controlled. For instance, when the GEO-Decoy is powered up, a user can actuate buttons or keys that are detected through the Control System 240 and used to select or program the operation of the GEO-Decoy. Thus, a user can select to have the GEO-Decoy operate in one mode, such as following pattern 1, for a given period of time and then switch to a different mode upon the expiration of that time period.

Some embodiments may include a wireless receiver within the GEO-Decoy to allow the user to remotely control the operation of the GEO-Decoy. For instance, as a non-limiting example, a handheld device may include a variety of buttons or keys that can be actuated to send specific commands to the GEO-Decoy. Exemplary commands may include changing a mode of operation (i.e., picking a new pattern for the decoy), changing the speed, sounding an audible alarm (such as a quacking noise) or turning on a light to help the hunter locate the GEO-Decoy, etc.

In an exemplary embodiment, the remote control may be a dedicated electronic device that communicates wirelessly with the GEO-Decoy, such as with WI-FI, BLUETOOTH, ZigBee or unlicensed RF frequencies, infrared or other wireless technologies. In such embodiments, the GEO-Decoy includes a wireless transceiver and the remote control includes a wireless transceiver. However, it will be appreciated that in some embodiments, a "dumb" remote may be used. In such an embodiment, the remote does not provide any analysis or control of the decoy but rather simply sends signals commensurate with commands that have been selected on the user interface of the remote control. All analysis and processing then would take place within the electronics or control system within the decoy. In such an embodiment, the remote control may only include a transmitter rather than a transceiver. In addition, in some embodiments, the decoy may be considered the "dumb" device and all processing can occur within the remote control. In such embodiments, the processing and analysis occurs within the remote control and commands used to steer and navigate the decoy are sent to a receiver within the decoy. Thus, in such embodiments the decoy would only need a receiver rather than a transceiver. Still in other embodiments, various processing functions may be distributed in a wide arrange of techniques between the decoy and the remote control. In such embodiments, the decoy and the remote would both require a transceiver. A common communication protocol is shared between the two devices for sending commands, control signals and obtaining status and responses.

FIG. 8 is a conceptual diagram showing various features and aspects of a mobile device based remote control app interfacing to a decoy. In such embodiments, the remote control device may be an app running on a mobile device, such as an IPHONE, ANDROID, etc. As such, the user can download a control app from the Apple Store or Google Play Store (as well as other similar stores or downloadable sources) and run the app on his or her mobile device. Upon initiation, the user can insure that the remote control and the GEO-Decoy 800, with its internal hardware and/or software control circuitry 810 and 240 are communicating correctly. For instance, in a BLUETOOTH based system, the user can pair one or more GEO-Decoys with the app. Once paired, the user can be presented with a home screen 880A. In the illustrated embodiment, the home screen 880A depicts a plurality of soft buttons that can be selected by a user. For instance, the user can actuate the SELECT PATTERN soft button which could result in traversing to the pattern selection screen 880B. An exemplary patent selection screen may offer multiple patterns that the user can select, such as circle, range, square, triangular, zig-zag, random, custom, etc. In the illustrated pattern selection screen 880B, circle, range, random and custom are illustrated.

The home screen 880A may also include a RETURN button. The RETURN button may be used to retrieve the GEO-Decoy 800 by having the GEO-Decoy 800 navigate to the user. For example, upon actuating the RETURN button, the app may read the location coordinates of the mobile device and then send a command to the GEO-Decoy 800 requesting the GEO-Decoy 800 to proceed to the location of the mobile device. The GEO-Decoy 800 may include a tracking algorithm internally, similar to the algorithm depicted in FIG. 6, and use the received location as the next destination. Thus, the hunter can retrieve the GEO-Decoy 800 by actuating the RETURN button and causing the GEO-Decoy 800 to return to the hunter. In other embodiments, the tracking algorithm may reside within the app only. In such embodiments, the app would end querying the GEO-Decoy 800 to identify its current location, then calculate speed and steering commands to send to the GEO-Decoy 800 to direct the GEO-Decoy 800 towards the hunter's location. In other embodiments, actuating the RETURN button may result in guiding the GEO-Decoy to return to the base location and hover at that location for retrieval.

It should be appreciated that in some embodiments, a single remote control can be utilized to control multiple GEO-Decoys. For instance, a dedicated remote control may include a switch to select which GEO-Decoy is to be controlled or, may include a dedicated set of buttons for each GEO-Decoy. In some embodiments, the communication between the remote control and a particular GEO-Decoy may be controlled by addressing headers, frequency differences, as well as other techniques known to those skilled in the art. In a mobile device or smart phone embodiment running an app, the interface may allow the user to select which of the GEO-Decoys to control, which subset of decoys or to select all decoys. For instance, in an exemplary embodiment, actuating the RETURN button in a multi-GEO-Decoy environment may result in navigating all of the GEO-Decoys to the base location for retrieval.

In some embodiments, in addition to the RETURN function, or in lieu thereof, the GEO-Decoy may include a battery level sensor and, when the battery level drops below a particular threshold, the decoy may report the battery level to the remote control and/or automatically invoke an action, such as powering down, returning to the base location, sounding an alarm, etc.

The home screen 880A is also shown as including an ALARM button. In an exemplary embodiment, the GEO-Decoy 800 may include a light, a buzzer or other visual/audio device such as a device to generate quacking sounds. In response to a user actuating the ALARM button, a command can be sent to the GEO-Decoy 800 to cause the light and/or buzzer to go off, thus creating visual and/or audio alarm that can be used to help a hunter find a missing GEO-Decoy.

The home screen 880A is also shown as including a STATUS button. In an exemplary embodiment, the STATUS button can be used to obtain a current status of the GEO-Decoy 800. For instance, the app may send a status request to the GEO-Decoy and the GEO-Decoy may respond by sending its current location, orientation, speed, battery level, alarm state, current mode of operation, etc.

In the exemplary pattern selection screen 880B, the user is presented with options to select a CIRCLE pattern, a RANGE, a RANDOM pattern or a CUSTOM pattern. Selecting the CIRCLE pattern, in some embodiments, may result in sending a command to the GEO-Decoy to invoke a program that cause the GEO-Decoy to move in a circular pattern relative to a particular location. For instance, actuating the CIRLCE button may result in requesting the GEO-Decoy to move in a circular pattern relative to its current location and to maintain a radius of X from the current location. Alternatively, upon selecting the CIRCLE button, the user may be prompted to enter or select a value for the radius and the speed.

Selecting the RANGE button may result in prompting the user to enter a distance that the GEO-Decoy can move within or from a particular location. Selecting the RANDOM button can result in moving the GEO-Decoy in a random fashion or, in selecting a pattern from random or, randomly changing the selected pattern. Selecting the CUSTOM button may transition to a custom pattern screen 880C. It should be understood that many other configurations for the pattern selection screen 880B may be utilized with different buttons, menu access, and other designs and the illustrated screen is just one non-limiting example. The user may have access to many other patterns and parameter configurations for those patterns etc.

In the various embodiments, when a particular pattern is selected, the tracking algorithm may proceed to move or navigate the GEO-Decoy relative to a base location. For instance, if a circle pattern is selected, the GEO-Decoy may be moved in a circular pattern that is centered on the base location. If a FIG. 8 pattern is selected, the GEO-Decoy may be moved in a FIG. 8 pattern that crosses over at the base location, as a non-limiting example. It should also be appreciated that in some embodiments, or for some patterns, multiple base locations may be selected. For instance, if a triangular pattern is selected, the GEO-Decoy may be moved in a triangular fashion between three base points in some embodiments, or moving in a triangular pattern that is centered on a single base point in other embodiments.

The base location may be the GEO-Decoy's "current location", a "selected location" or a "relative location" (such as 30 feet north from the current location). For the "current location" configuration, the base location would be determined based on the current physical location of the GEO-Decoy at a particular time, such as the time the GEO-Decoy is being deployed. Thus, the positioning receiver 210 can be read to obtain the current location, and then the tracking algorithm can commence based on the received current location. In the "selected position" configuration, the user can select a base location. For instance, the mobile app may present a map on the screen based on the current location of the mobile device. The user can then touch the screen at the location he or she desires to be the base location. In response to the selection, the position coordinates associated with the selected location can be extracted and provided to the tracking program. In the multi-base location embodiments, the user can select multiple locations in this same manner. In the "relative location" configuration, the user sets the base location to be an offset from the current location. Thus, the user can select a distance and a direction. The positioning receiver 210 can be read to obtain the current location and then the base location can be calculated based on the distance and direction. For instance, if the user is standing in the hunting vicinity, such as a field, marsh, on the bank or body of water, the hunter can look around to identify an ideal base location. The user can then look at a compass to determine the direction to the desired base location (or estimate using the location of the sun) and then measure or estimate the distance to the desired base location. The GEO-Decoy can then be deployed or launched at the hunter's current position and the tracking algorithm can operate to move the GEO-Decoy towards the calculated base location as part of the tracking algorithm's operation.

In various embodiments, the technique used to determine the base location may be selected as a default when the user initializes the device or in the system settings of the mobile app, programmed into the GEO-Decoy and or remote control at the time of manufacture or be selected at time of deployment or in real-time by the user.

The tracking algorithm and/or control software can reside and run within the GEO-Decoy 800, within a remote control or a combination of both. In the GEO-Decoy based embodiments, the remote control or mobile app would interact with the GEO-Decoy by sending commands and obtaining status. For instance, if a user selected to operate the GEO-Decoy in a circular pattern, the mobile app could send a command to the GEO-Decoy to request such operation. The software or system within the GEO-Decoy, in response to the command, could launch a tracking algorithm to control the navigation of the GEO-Decoy and cause it to follow a circular pattern. Further, the software within the GEO-Decoy could also send prompts to the remote or mobile app requesting further information, such as the radius of the circle, the speed of the GEO-Decoy, the selection of base location, etc. The tracking algorithm, such as the algorithms of FIG. 5, FIG. 6 or FIG. 7, as non-limiting examples, can control the operation or navigation of the GEO-Decoy to maintain it within the selected pattern or range.

As with typical wireless and/or battery based devices, the operation of the GEO-Decoy is limited based on the battery life (i.e., how long it takes the operation of the GEO-Decoy to deplete the stored battery charge). As such, in various embodiments the system may operate to maximize the battery life. One such technique that can be employed in the various embodiments is to periodically turn the heavy power consuming components off. For instance, the propulsion system can be turned on and off over a duty cycle to prolong battery life. As non-limiting examples, the propulsion system can be turned on and off at a 50-50 duty cycle, 60-40 duty cycle 70-30, 40-60 etc. In another embodiment, the direction and speed information may be prepared based on the current location of the GEO-Decoy, and the propulsion system can be turned on and off periodically based on how well it is progressing towards the target location. For instance, if the GEO-Decoy is being driven towards a desired location by the wind, the propulsion system may be utilized less. Thus, if the program determines that the movement of the GEO-Decoy between readings exceeds an expected threshold, the program may determine that currents or wind is helping to propel the GEO-Decoy. The program may then augment the duty cycle of the propulsion system to take advantage of the natural propulsion and thus save batter life.

In some embodiments, the GEO-Decoy may include a battery charging port and algorithms for charging the battery. As a non-limiting example, if a power source is plugged into the charging port, the processor may detect the presence of the charging source and invoke a charging algorithm. The processor can monitor the temperature of the batteries, the voltage level of the batteries, the amperes provided to the charging circuit etc. and control the charging operation accordingly.

It should be appreciated that in a typical hunting environment, the hunting area may be exposed to natural elements, such as wind and/or water flow. In heavy wind or strong water flow environments, the untethered operation of the GEO-Decoy may not be practical. For instance, the wind or current may over power the propulsion system thus preventing the desired navigation of the GEO-Decoy or even driving the GEO-Decoy away. At times, it may be desirable to utilize the GEO-Decoy in such windy or strong current environments. It may be inconvenient for hunters to bring both a set GEO-Decoys as well as a set of anchored decoys to a hunting sight. As such, some embodiments of the GEO-Decoy may be equipped with a line and an anchor. In such embodiments, if the current and/or wind conditions are too strong, the hunter can simply deploy the GEO-Decoys like a normal anchored decoy by attaching one end of the line to the GEO-Decoy and the other end to an anchor, such as a lead weight. The anchor can then be dropped in the water and the decoy will be driven by the wind and/or current but, its motion will be limited by the attached line.

In some embodiments, the navigational control of the GEO-Decoy may be used in conjunction with a line and anchor during heavy wind and/or current environments. For instance, the line and anchor can be deployed as described above during windy or high-current conditions. The remote control may include a button, such as a WINDY button that can be actuated to cause the navigational system to control the GEO-Decoy in this mode of operation. Alternatively, or in addition, the navigational system can autonomously monitor the location of the GEO-Decoy and, the navigational system can determine if the GEO-Decoy is at the end of the taut line and just sitting in one location and then automatically invoke the WINDY mode of operation. In either case, the navigational system can then cause the GEO-Decoy to move towards a new location. For instance, the GEO-Decoy can receive a heading or a direction (i.e. 360 degrees) and a speed (i.e., and ¾ throttle) and then the tracking program can navigate the GEO-Decoy accordingly. When the GEO-Decoy reaches a desired location, such as the end of the line in the selected heading, or a particular distance such as 15 feet, the navigation program can turn off the propulsion system and allow the GEO-Decoy to begin to drift again at the forces of the wind and/or current. The program can repeat this process during the operational hunt.

Similarly, if the user has deployed multiple GEO-Decoys, each of the GEO-Decoys may be given a different heading. For instance, one GEO-Decoy may be sent at 180 degrees, one at 160 degrees, one at 140 degrees and one at 200 degrees. It should also be appreciated that in some embodiments utilizing multiple decoys, the decoys can include sensors and proximity detectors to detect the presence of other decoys and the posed-gender of the decoys and enter algorithms to move in relationship to each other to simulate a real-life scenario of ducks or fowl interacting with each other.

In some embodiments, the remote control may include a swim randomly button that can be used either in the free form mode of operation or the anchored/tethered form of operation.

Some embodiments of the GEO-Decoy may include a self-deploying and retracting line and anchor. The GEO-Decoy may include a recess, a trap door or an external mount for receiving an automatic winding and unwinding spool, like a mini-wince, that can be controlled by the processor to deploy or retract the anchor and line. Thus, if the navigational system determines that the GEO-Decoy is being driven by wind or currents, or if the user manually selects the appropriate actuator, the GEO-Decoy may deploy the anchor and line and commence WINDY mode of operation. If the conditions change, then the GEO-Decoy may automatically retract the line and anchor or, the user can manually trigger the retraction of the same.

In addition, some embodiments may include an ON/Off button on the remote and/or the GEO-Decoys to allow the GEO-Decoys to be turned off when not in use. This feature is useful during transport of the GEO-Decoys, during inactive periods during the hunt, etc. In addition, a user may want to turn off one or more of the GEO-Decoys if something is wrong, such as the GEO-Decoy is stuck in shallow water, the propulsion system has sucked up some grass or weeds, etc. Having the ability to turn one or more of the GEO-Decoys off from the remote control can prevent the GEO-Decoy from getting damaged, lost or from draining the battery. As such, some embodiments may include an auto-off feature that is triggered automatically based on particular conditions. In some embodiments, the auto-off feature may be triggered manually rather than automatically. As a non-limiting example, if the GEO-Decoy has not moved for a period of time or has veered off course and is not correcting itself, the auto-off feature can be triggered to power down the device. Such a feature may prevent the GEO-Decoy from damaging itself, getting lost, etc. It should be appreciated, that rather than powering down the GEO-Decoy, the detected conditions may result in immobilizing the device and/or causing it to sound an alarm. It should be appreciated that the auto-off feature can be implemented within the GEO-Decoy and/or the remote control.

In other embodiments, the tracking algorithm and/or control software can reside and run within the remote control, such as a mobile app running on a mobile device. In such embodiments, the remote control interfaces with a user for the selection of the tracking operation, and then interfaces with the GEO-Decoy with control and status instructions. As an example, a user may interface with the remote control to select a circular pattern at a specific radius and speed, and identify a base location. This information can be loaded into the tracking algorithm and the remote control can access the GEO-Decoy to determine its current location, speed, direction, etc. Based on the received information, the selected pattern, the base location and other location information that may be associated with the pattern, the tracking algorithm can calculate the speed and directional adjustments that need to be made to keep the GEO-Decoy on pattern. Control commands can then be sent from the remote control to the GEO-Decoy to make the calculated adjustments. This process can be repeated while the GEO-Decoy is deployed.

Yet in other embodiments, a hybrid approach can be utilized by distributing various levels of operation and control between the remote control and the GEO-Decoy.

Screen 880C of the remote control illustrates the operational state when a user selects a custom pattern. This feature is especially advantageous in an area that may include rocks, trees, stumps, thick patches of grass, etc. The screen of the remote control, such as a mobile device running a mobile app, can represent the area in which the GEO-Decoy is to be deployed. In one embodiment, the user can simply draw a pattern on the screen and the app will use that pattern for navigation of the GEO-Decoy. In some embodiments, a satellite image of the area, such as GOOGLE satellite image, may be presented on the screen and the user can draw a pattern that navigates around natural obstacles, such as rocks, trees, stumps, patches of grass, etc.

Screen 880D of the remote control illustrates the operational state when a user selects to have direct control over the navigation of the GEO-Decoy. In an exemplary embodiment, the user can touch on the displayed arrows F to move the GEO-Decoy forward, L to move the GEO-Decoy to the left, R to move the GEO-Decoy to the right and B to move the GEO-Decoy backwards. A touch location at the center of the arrows could be used to cause the GEO-Decoy to stop. Further, the user may have a speed control such as the slide control labeled SPEED. The user can move the slide towards the [−] label to decrease the speed and towards the [+] to increase the speed. It should be appreciated that in some embodiments, the user can maintain direct control over the navigation of the GEO-Decoy using this interface and, in addition, in some embodiments the tracking software may record the selected navigational control for a period of time and then, continuously repeat the recorded pattern.

Figure 9:
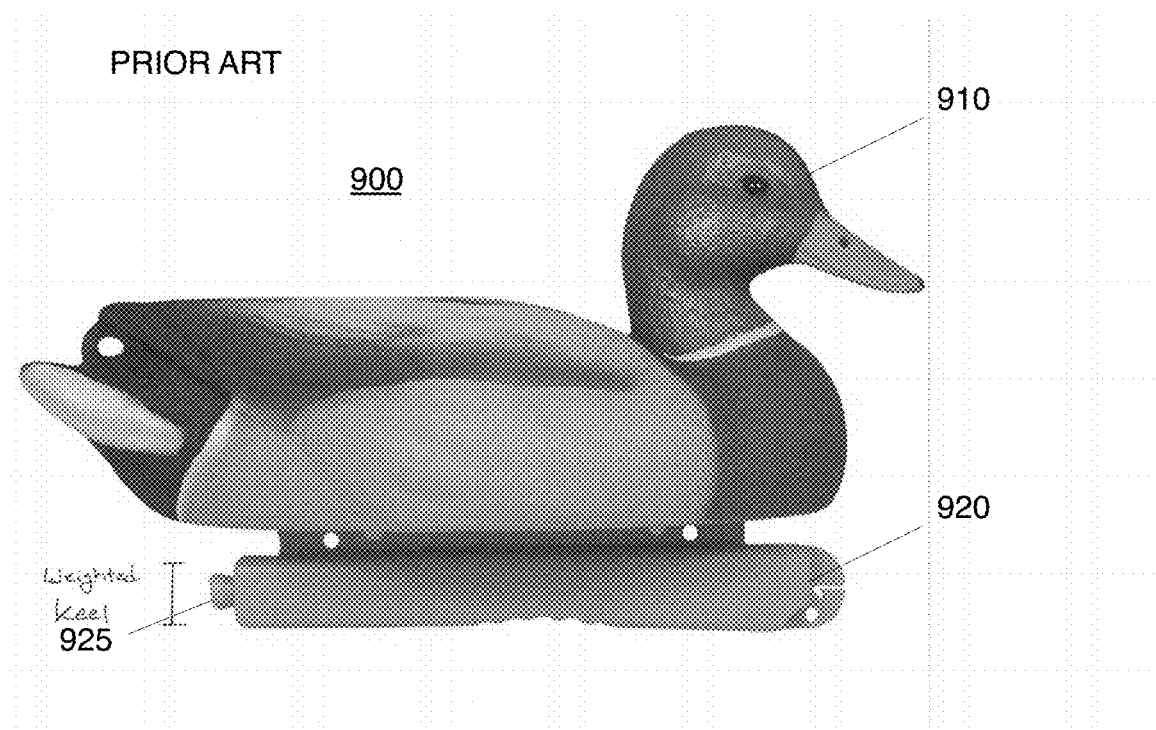
FIG. 9 is a conceptual diagram showing a prior art decoy with a ballast that can be modified in accordance with the present invention.

FIG. 9 is a conceptual diagram showing a prior art decoy with a keel that is also operating as a ballast. The illustrated prior art can be modified in accordance with the present invention. The decoy 900 includes a main body 910 and a keel/ballast 920. The main body 910 can be constructed of a variety of materials as described herein, as well as other materials, to ensure that the duck body floats on top of the water. However, it should be appreciated that the use of a ballast 920 or weighting system under the main body 910 can be used to provide stability and prevent the decoy from turning upside down rolling. As those skilled in the art will understand, a ballast is a heavy element that is attached under a floating device or associated with a lower portion of a floating device, such as a ship or balloon gondola to enhance the stability of the same. The ballast can be constructed from a wide range of materials but a high level of density is desirable. As such sand, lead and other such elements provide good materials for a ballast. The ballast can be a solid material or it can be hollow and include an opening or plug 925 to allow a substance to be filled into the hollow cavity of the ballast 920. For example, the plug 925 can be removed and sand can be poured into the hollow ballast 920 and the ballast 920 resealed, as a non-limiting example.

Figure 10:
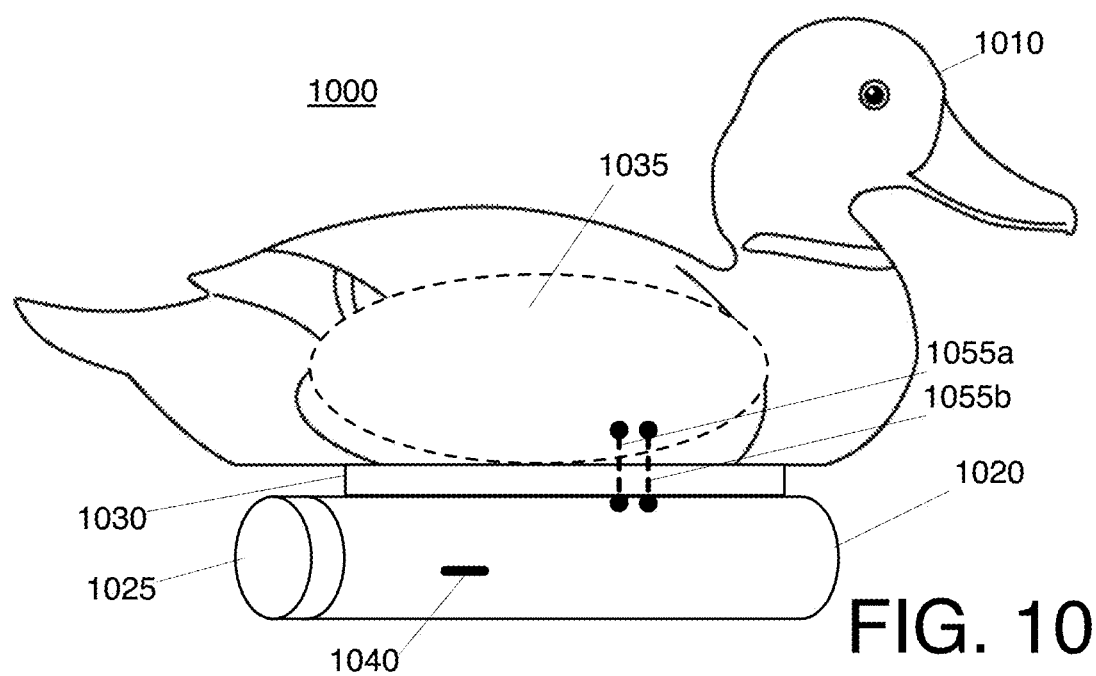
FIG. 10 is a conceptual diagram showing an exemplary embodiment of a battery pack ballast for a decoy.

FIG. 10 is a conceptual diagram showing an exemplary embodiment of a battery pack keel/ballast for a decoy. In the illustrated embodiment, the decoy 1000 includes a main decoy body 1010, which can be similar to the GEO-Decoys that have been described herein, and a sleeve 1020 for receiving and housing one or more batteries. The sleeve 1020 is illustrated as being attached to the decoy body 1010 with a flange 1030, but multiple flanges, or other techniques may also be used to attach the ballast 1020 to the main body 1010. Advantageously, as the ballast sleeve 1020 is moved further below the decoy body 1010, the stability is enhanced. As such, the ballast 1020 may be attached with various sized flanges 1030 that can be used in varying wind and water condition scenarios.

As previously described, the GEO-Decoy can be powered by a stored power system, such as batteries, rechargeable batteries, solar rechargeable batteries, solar assist rechargeable batteries, etc. as a few non-limiting examples. In general, any portable and wireless power source may be utilized for various embodiments of the GEO-Decoy. As a non-limiting example, an embodiment may employ the use of NiCad, Lithium Ion, NiMH, acid, or other battery technologies.

The sleeve 1020 is illustrated as a tube but, the sleeve can actually be any of a wide variety of shapes and sizes. Preferably, the sleeve is sized to receive and house a battery or a battery pack that is used for powering circuitry 1035 within the decoy body 1010. At least two lines, contacts or connections (referred to as connections hereinafter) 1055*a* and 1055*b* are provided between the battery or battery pack within the sleeve 1020 and the circuitry 1035 within the decoy body 1010. These connections include a positive connection and a return or ground connection. It should be appreciated that other connections may also be provided. For instance, a thermistor can be included within the sleeve to measure the temperature. The thermistor may be connected to the control circuitry 1035 so that the temperature can be monitored to assist or optimize charging cycles, detect overload conditions, etc.

In some embodiments, the battery and/or battery pack can utilize disposable batteries. As such, the cap 1025 can be removed from the sleeve 1020 and the disposable batteries can be inserted into the sleeve 1020. The cap 1025 can then be replaced. The cap 1025 is configured such that when it is installed on the sleeve 1020, the interior of the sleeve 1020 is sealed so that water cannot invade the interior of the sleeve 1020. It should be appreciated that the cap 1025 can be a screw on cap, a snap on cap, a plug or a variety of other water tight techniques. In addition, rather than a water tight connection with the cap 1025 and sleeve 1020, a silicon or rubber sheath can be fitted over the cap end of the sleeve. The sheath can be configured to provide a tight fit to prevent water from entering the interior of the sleeve 1020.

In some embodiments, rechargeable batteries can be utilized. The rechargeable batteries can be inserted into the sleeve 1020. However, it should be appreciated that some embodiments may not include a sleeve type structure but rather simply include a casing or water proof wrapping of the rechargeable batteries. Because the rechargeable batteries do not need to be removed or replaced, a cap is not necessary. As such, a rubber coating can be used to completely encase the batteries with the exception of the contacts. Further, the entire battery back can then serve as the ballast and when the batteries reach their life expectancy, the entire battery pack can be replaced.

For the rechargeable embodiments, a port 1040 may be included on the sleeve 1020, or encasement, to enable the connection of a charging source for charging the batteries. In such embodiments, the port 1040 may include a plug to prevent the ingress of water into the sleeve or battery area. Alternatively, the port 1040 may be included in the decoy body 1010. It should be appreciated that the circuitry for recharging the batteries may be included in the interior of the decoy body 1010 or the ballast or sleeve 1020 or it may be external to both the sleeve 1020 and decoy body 1010 and simply connected to the batteries via the port 1040.

Some embodiments may include a hybrid of charging circuitry and functionality. For instance, heat striking the surface of the decoy 1000 can be converted into energy that is then applied to the batteries as a trickle charge. Likewise, solar cells can be included on the decoy 1000 to collect light and convert the same into charging energy. The use of trickle charging can prolong the charge cycle of the batteries and hence increase the use time of the decoy between charges.

In some embodiments, the ballast 1020 can be detached from the main body 1010 of the decoy and suspended by a conductive cable and thus used as an anchor for the decoy and a range boundary definition. In other embodiments, waterproof batteries could simply be attached to the bottom of the GEO-Decoy using hook and loop material, VELCRO, clamps, etc. In some embodiments, the GEO-Decoy may include a built in keel that is configured to either receive the batteries or to hold the batteries. For instance, the underside of the GEO-Decoy may define a keel that includes an opening for receiving one or more batteries.

The various embodiments have been described as including software and firmware elements that may exist in a memory element of the GEO-Decoy and/or a memory element within the remote control. Some embodiments have been described as a GEO-Decoy system that includes all of the operational elements within itself, while other embodiments have been described as utilizing a remote control to operate in conjunction with the GEO-Decoy. Further, in these latter embodiments, the functionality required to operate and control the navigation of the GEO-Decoy can be distributed between the operational elements within the GEO-Decoy and the remote control. It should be appreciated that such functional elements can be implemented in hardware, firmware, software, etc. as well as any combination of these. In embodiments that utilize software and/or firmware, there may be a need to upgrade the software/firmware to provide bug fixes and/or additional features. The GEO-Decoy and the remote control may include a port or an interface, along with the necessary control mechanisms, to receive such software and/or firmware upgrades or, the devices may include a removable and replaceable component part for such upgrades (i.e. customized ASIC, ROM chip, EPROM chip, etc.). It should be appreciated that software updates may also be performed wirelessly or over-the-air for both the GEO-Decoy and the remote control. Those skilled in the art will be familiar with the various techniques available for accomplishing this and any such technique may be utilized in the various embodiments. As a non-limiting example, in the embodiment that includes a mobile device running a downloadable app and interfacing to the GEO-Decoy, updates can be performed by prompting the user to download a new version of the app for the remote control, and then the remote control interfacing with the GEO-Decoy to update the software within the GEO-Decoy.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A decoy system comprising:
a decoy body;
a propulsion system coupled to the decoy body;
a steering system coupled to the decoy body;
a processor associated with the decoy body and communicatively coupled to the propulsion system and the steering system and configured to receive instructions and execute the instructions to navigate the decoy body by controlling the propulsion system and steering system, wherein the processor is further configured to read the instructions from a tangible medium and execute the instructions to monitor a voltage level of a battery element and if the voltage level drops below a particular threshold, the processor controls the navigation of the decoy body by sending it to a particular location;
a positioning receiver coupled to the decoy body and configured to provide a current location of the decoy body; and
a ballast coupled to an underside of the decoy body and configured to house the battery element, the ballast includes at least two connections for connecting from the battery element to the propulsion system, steering system and processor.

2. A decoy system comprising:
a decoy body;
a propulsion system coupled to the decoy body;
a steering system coupled to the decoy body;
a processor associated with the decoy body and communicatively coupled to the propulsion system and the steering system and configured to receive instructions and execute the instructions to navigate the decoy body by controlling the propulsion system and steering system, wherein the processor is further configured to read the instructions from a tangible medium and execute the instructions to monitor a voltage level of a battery element and if the voltage level drops below a particular threshold, the processor causes an alarm to sound;
a positioning receiver coupled to the decoy body and configured to provide a current location of the decoy body; and
a ballast coupled to an underside of the decoy body and configured to house the battery element, the ballast includes at least two connections for connecting from the battery element to the propulsion system, steering system and processor.

3. A decoy system comprising:
a decoy body;
a propulsion system coupled to the decoy body;
a steering system coupled to the decoy body;
a processor associated with the decoy body and communicatively coupled to the propulsion system and the steering system and configured to receive instructions and execute the instructions to navigate the decoy body by controlling the propulsion system and the steering system, wherein the processor is further configured to read the instructions from a tangible medium and execute the instructions to monitor a voltage level of a battery element and if a power source is connected to the charging port, to execute a charging algorithm;
a positioning receiver coupled to the decoy body and configured to provide a current location of the decoy body; and
a ballast coupled to an underside of the decoy body and configured to house the battery element comprising a plurality of rechargeable batteries, the ballast includes at least two connections for connecting from the battery element to the propulsion system, steering system and processor, wherein the ballast comprises the plurality of rechargeable batteries arranged in a keel-like structure.

4. A decoy system comprising:
a decoy body;
a propulsion system coupled to the decoy body;
a steering system coupled to the decoy body;
a processor associated with the decoy body and communicatively coupled to the propulsion system and the steering system and configured to receive instructions and execute the instructions to navigate the decoy body by controlling the propulsion system and steering system, wherein the processor is further configured to read the instructions from a tangible medium and execute the instructions to monitor a voltage level of a battery element and if the voltage level drops below a particular threshold, the processor controls the navigation of the decoy body by sending it to a particular location;
a positioning receiver coupled to the decoy body and configured to provide a current location of the decoy body; and
a ballast coupled to an underside of the decoy body and configured to house the battery element comprising a plurality of rechargeable batteries, the ballast includes at least two connections for connecting from the battery element to the propulsion system, steering system and processor.

5. A decoy system comprising:
a decoy body;
a propulsion system coupled to the decoy body;
a steering system coupled to the decoy body;
a processor associated with the decoy body and communicatively coupled to the propulsion system and the steering system and configured to receive instructions and execute the instructions to navigate the decoy body by controlling the propulsion system and steering system;
a positioning receiver coupled to the decoy body and configured to provide a current location of the decoy body; and
a ballast coupled to an underside of the decoy body and configured to house a battery element, the ballast includes at least two connections for connecting from the battery element to the propulsion system, steering system and processor;
a remote control;
a control system communicatively coupled to the processor, the control system being configured to wirelessly interface with the remote control and the processor is configured to provide data to the control system to be transmitted to the remote control and obtain data received by the control system from the remote control; and wherein the processor is further configured to read instructions from a tangible medium and execute the instructions to monitor a voltage level of the battery element and if the voltage level drops below a particular threshold, the processor causes an alarm message to be sent to the remote control.

6. The decoy system of claim 5, wherein the remote control and the control system are communicatively coupled with BLUETOOTH wireless technology and the control system reports a battery status to the remote control.

\* \* \* \* \*